Figure 8:
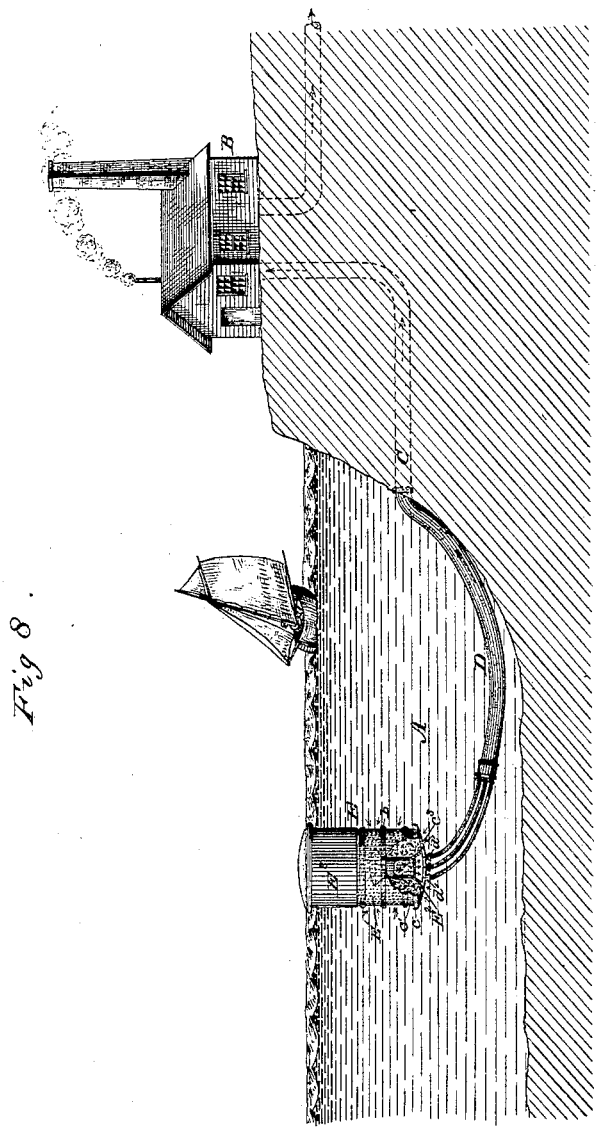

(No Model.) 2 Sheets—Sheet 1.
J. H. BREESE.
FLOATING FILTER.
No. 318,689. Patented May 26, 1885.
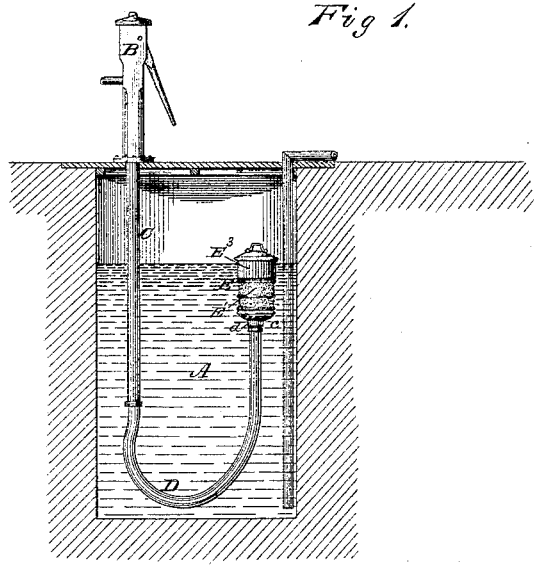
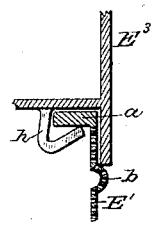
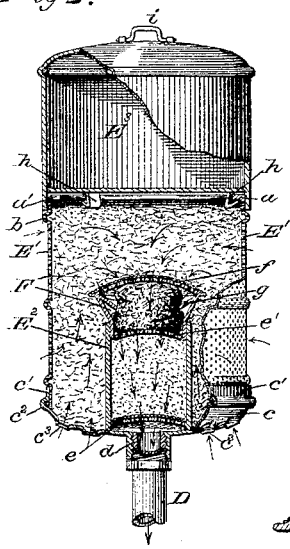
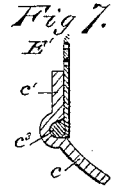
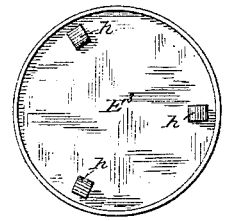
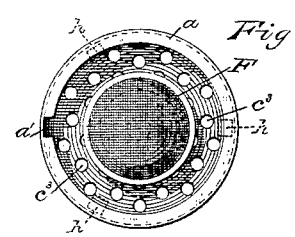
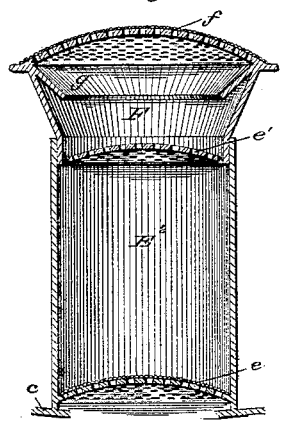
WITNESSES:
Harry King
N. L. Collamer
INVENTOR:
John H. Breese
By his Att'y,
J. C. Somes (No Model.) 2 Sheets—Sheet 2.

J. H. BREESE.
FLOATING FILTER.

No. 318,689. Patented May 26, 1885.

WITNESSES:
Harry King
N. L. Collamer

INVENTOR:
John H. Breese,
By his Att'y, F. L. Soules.

UNITED STATES PATENT OFFICE.

JOHN H. BREESE, OF DAVENPORT, IOWA.

FLOATING FILTER.

SPECIFICATION forming part of Letters Patent No. 318,689, dated May 26, 1885.

Application filed January 2, 1885. (No model.)

*To all whom it may concern:*

Be it known that I, JOHN H. BREESE, a citizen of the United States, residing at Davenport, in the county of Scott and State of Iowa, have invented certain new and useful Improvements in Floating Filters, of which the following is a specification, reference being had therein to the accompanying drawings, which is sufficiently full, clear, and exact to enable any person skilled in the art or science to which said invention appertains to make and use the same.

This invention relates to an apparatus designed for use in connection with dwellings, hotels, factories, city water-works, stationary engines, &c., for drawing water from tanks, cisterns, wells, rivers, lakes, or other vessels or bodies of water, avoiding all surface-floatings and sediment.

The object of the invention is to provide a floating filter, forming a part of the apparatus, which will not become clogged by dirt or sediment, which will be strong, through which the water readily taken apart, through which a thorough filtration of the water drawn from the tank or well will be secured.

Figure 1 of the drawings is a vertical section of a tank or cistern provided with this improved apparatus. Fig. 2 is an elevation, partly in section, of the improved floating filter forming part of the said apparatus. Fig. 3 is a bottom view of the air-chamber forming a part of the said floating filter. Fig. 4 is a top view of the filtering-chamber constituting part of the said floating filter. Fig. 5 is a vertical section of the inner cylinder and the sponge-chamber forming a part of said floating filter. Fig. 6 is a detail of the joint between the air-chamber and filtering-chamber of this improved floating filter. Fig. 7 is a detail of the joint formed between the sides and bottom of the filtering-chamber of this improved floating filter. Fig. 8 represents the apparatus on a large scale in connection with a pumping-engine for supply of cities, elevating water to reservoirs or other purposes, the lower portion of the filter being shown in section, bottom parts being broken away.

Similar letters of reference indicate corresponding parts in the different figures.

A represents the vessel or body of water, from which water is to be drawn by this apparatus for immediate use, or for storage for future use. This generally consists, in the former case, of a tank, well, or reservoir, located at any convenient point, and in the latter case, of a river, lake, pond, or other original source of supply.

B represents a water-drawing apparatus, which may consist of an ordinary pump, a hydraulic pump, a wind-mill pump, a steam-pump, or other suitable device for this purpose.

C represents a drawing-off pipe, which connects the vessel or body of water A with the water-drawing apparatus B, said pipe extending considerably below the surface of the water or to near the bottom of the well, tank, or reservoir. A flexible hose, D, of india-rubber or other suitable material, provided with couplings at both ends, is connected at one end to the inner end of the pipe C, and at its other end to the lower end of a floating filter, E. The floating filter E comprises an outer perforated cylinder, E', a smaller imperforate cylinder, $E^2$, of about half the length of the outer cylinder, arranged axially within the latter and extending upward from the bottom thereof, a sponge-chamber, F, surmounting the top of said short inner cylinder, and an air-cylinder, $E^3$, attached to the upper end of said outer cylinder. The body of the outer cylinder, E', is preferably composed of finely-perforated sheet metal, and at its upper end is an inward flange, a, provided with a recess, a', and its body is strengthened by circumferential ribs b, which may be provided with stiffening-wires. The bottom c is provided with a vertical flange, c', which shuts over the lower end of the outer perforated cylinder, E', said bottom being provided with a stiffening-bead, $c^2$, inclosing a stiffening-wire. Holes $c^3$ are formed in the bottom considerably larger than the perforation in the body of the outer cylinder, which holes prevent the accumulation of sediment at the bottom of the filter. This bottom c is provided with a downward-projecting screw-threaded tube, d, to which the hose-coupling is attached when the filter is in operation. The short inner imperforate cylinder, $E^2$, is integral with or attached to the said bottom c, and extends upward therefrom a distance equal to about half the length of the outer perforated cylinder, said imperforate cylinder being opposite the tube $d$. This cylinder is provided at its bottom with a perforated metal diaphragm, $e$, overlaid with fine wire-gauze, which prevents the escape of filtering material into the drawing-off pipe, and at its top with a similar diaphragm, $e'$, which prevents said material from jostling from side to side when the filter is rocked in the water. When the filter is used in connection with steam-pumps for supply of large tanks, water-works, or other purposes, the lower end of the inner imperforate cylinder, $E^2$, is made flaring or oblong, and its bottom is provided with two or more eduction-tubes, $d'$, to which a corresponding number of flexible hose are attached, which latter may connect with couplings at the ends of a large stand-pipe, as shown in Fig. 8.

The sponge-chamber F consists of a flaring cap, which fits into or over the top of the inner cylinder, $E^2$. The top of this cap is perforated and covered with fine wire-gauze $f$. The interior of this sponge-chamber is provided with an inwardly-projecting flange, $g$, inclined downward, which flange serves to direct all the water onto the sponge and causes it to pass through the latter, whereby the escape of any of the water down the sides of the chamber without the filtering action of the sponge is prevented. The wire-gauze diaphragm $e'$ separates the sponge-chamber from the inner cylinder.

The air-chamber $E^3$ consists of a hollow chamber having a tight head and a tight bottom, the bottom, which is a short distance from the lower end of the chamber, being provided with angular lugs or hooks $h$, and the top with a pivoted handle, $i$. This chamber is detachably connected with the outer perforated cylinder by means of the recessed flange $a$ of the latter in connection with the lugs $h$ of the former, which lugs take under the flange and form a strong connection between the two parts.

In removing the air-chamber from the filtering-cylinder the former is turned until one of the lugs comes opposite the recess $a'$ in the flange $a$ when the top is lifted, so as to withdraw said lug through said recess. The air-chamber is again turned until the second and third lugs come successively opposite the recess and are withdrawn in a like manner.

Instead of a single recess, the flange $a$ may be provided with as many recesses as there are lugs, so that all the lugs may be withdrawn simultaneously.

The inner imperforate cylinder, $E^2$, is filled with silicious sand or other fine filtering material, and the diaphragm $e'$ placed over said sand. A fine filtering-sponge of suitable size to properly fill the sponge-chamber, or layers of filtering-sponge are then inserted therein and said chamber placed in position over the imperforate cylinder by telescoping it into or over the upper end of said chamber, making a water-tight joint. The outer perforated cylinder, $E'$, is then filled with charcoal, preferably sweet-maple charcoal, or other light filtering material, the inner cylinder, $E^2$, and the sponge-chamber F being completely surrounded and covered thereby; or the filtering material may be arranged in layers of gravel, charcoal, silica, &c. When the floating filter is about the size of a forty-gallon barrel, there will be about a foot of filtering material over the top of the inner cylinder. The size of the filters will be varied for different uses, but the proportions will be about as represented.

The operation of this invention is as follows: The floating filter is connected with the suction-pipe near the bottom of the tank or well or body of water by means of the flexible tube or hose and floats freely in the water, being buoyed up by the air in its air-chamber, the amount of air being just sufficient to sustain the filter, so that the upper openings in the outer perforated cylinder will be a short distance below the surface of the water. The flexible tube allows the filter to adjust itself to the height of water and to maintain a vertical position therein, which is the one best suited to the thorough permeation of the filtering material. The water enters the filter through the entire circumference of the outer cylinder and through the openings in the bottom of said cylinder, and passing through the filtering material in the outer cylinder between the latter and the inner cylinder and between the bottom of the air-chamber and the top of the sponge-chamber, enters the sponge-chamber through its perforated gauze-covered top; thence passes through the sponge and through the diaphragm $e'$, and through the silicious sand into the inner cylinder, $E^2$, and thence enters the flexible tube through the lower diaphragm in a thoroughly-purified state. The wire-gauze covering the top of the sponge-chamber prevents the filtering material in the outer cylinder from clogging the sponge and the perforations in said cap. The flexible tube admits of the application of the apparatus to wells and cisterns of small diameter, since it may rise vertically near the suction-pipe. As there are no perforations in the sides of the inner cylinder, the water is compelled to pass upward and over the top thereof, whereby it comes into contact with a larger body of filtering material within the outer cylinder, and, as it can only enter the sponge-chamber through the top thereof, it must pass in a uniform downward current through the sponge-chamber and through the inner cylinder and the entire mass of filtering material therein.

I claim as my invention—

1. The combination of a water-reservoir, an eduction-pipe, a floating filter, and a flexible pipe connecting said floating filter with said eduction-pipe, said filter consisting of a buoyant air-chamber, two concentric filtering-cylinders, the outer filtering-cylinder being perforate, and the inner filtering-cylinder being imperforate and extending from the bottom of the outer cylinder upward about half the height of the outer cylinder, leaving a space between the tops of said inner and outer cylinders, and a perforate cap surmounting said inner cylinder, substantially as described.

2. The combination of a water-reservoir, an eduction-pipe, a floating filter, and a flexible pipe connecting said floating filter with said eduction-pipe, said filter consisting of a buoyant air-chamber and two concentric filtering-cylinders, the outer filtering-cylinder being perforate and the inner filtering-cylinder imperforate, and provided with a perforate top and extending from the bottom of the inner cylinder upward about half the height thereof, leaving a space between the tops of said inner and outer cylinders, the bottom of said filter being provided with open perforations outside the inner cylinder, which admit the free passage of water and prevent the accumulation of sediment, substantially as described.

3. A floating filter consisting of a bouyant air-chamber and two concentric filtering-cylinders of different diameters, the outer cylinder being perforate, and the inner cylinder being imperforate and extending from the bottom of the outer cylinder upward about half the height of the outer cylinder, leaving a space between the tops of said inner and outer cylinders, and a perforate cap surmounting said inner cylinder, substantially as described.

4. A floating filter consisting of a buoyant air-chamber, two concentric filtering-cylinders of different diameters, the outer filtering-cylinder being perforate, and the inner filtering-cylinder imperforate and extending from the outer cylinder upward about half the height of the outer cylinder, leaving a space between the tops of said inner and outer cylinders, and a sponge-chamber having a perforated top surmounting said inner cylinder, substantially as described.

5. A floating filter consisting of a bouyant air-chamber, two concentric filtering-cylinders of different diameters, the outer filtering-cylinder being perforate, and the inner filtering-cylinder imperforate and extending from the outer cylinder upward about half the height of the outer cylinder, leaving a space between the tops of said inner and outer cylinders, and a removable filtering or sponge chamber having a perforated top surmounting said inner cylinder, substantially as described.

6. A floating filter consisting of the buoyant air-chamber, two concentric filtering-cylinders of different diameters, the outer cylinder being perforate and the inner cylinder imperforate, said inner cylinder extending upward from the bottom of the outer cylinder about half the height of the latter, and a perforated sponge-chamber surmounting said inner cylinder, within the outer cylinder, provided with an interior downwardly-inclined flange which projects inward beyond the outer margin of the filtering material or sponge within said chamber for directing the water toward the center of the latter, substantially as described.

7. A filter having a chamber containing filtering material, said chamber being provided with an inwardly-projecting downwardly-inclined flange extending beyond the outer margin of the filtering material and serving to direct the water toward the center thereof and to prevent its escape down the sides of the chamber without the proper action of said material, substantially as described.

8. A floating filter consisting of a bouyant air-chamber, two concentric filtering-cylinders of different diameters, the outer cylinder being perforate and the inner cylinder shorter than the outer cylinder, and a perforated sponge-chamber provided with an interior flange for directing the water onto the sponge, substantially as described.

JOHN H. BREESE.

Witnesses:
　STEPHEN D. BAWDEN,
　BERT H. WILKINSON.